(12) United States Patent
Li et al.

(10) Patent No.: US 11,933,681 B2
(45) Date of Patent: Mar. 19, 2024

(54) FORCE SENSOR (71) Applicant: CARNEGIE MELLON UNIVERSITY, Pittsburgh, PA (US)

(72) Inventors: Lu Li, Pittsburgh, PA (US); H. Benjamin Brown, Pittsburgh, PA (US); Michael Schwerin, Pittsburgh, PA (US); Howie Choset, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 293 days.

(21) Appl. No.: 17/277,382

(22) PCT Filed: Sep. 23, 2019

(86) PCT No.: PCT/US2019/052519
§ 371 (c)(1),
(2) Date: Mar. 18, 2021

(87) PCT Pub. No.: WO2020/061592
PCT Pub. Date: Mar. 26, 2020

(65) Prior Publication Data
US 2022/0034731 A1 Feb. 3, 2022

Related U.S. Application Data

(60) Provisional application No. 62/765,959, filed on Sep. 21, 2018.

(51) Int. Cl.
*G01L 1/00* (2006.01)
*G01L 1/22* (2006.01)
*G01L 5/1627* (2020.01)

(52) U.S. Cl.
CPC .............. *G01L 1/22* (2013.01); *G01L 5/1627* (2020.01)

(58) Field of Classification Search
CPC .................................. G01L 1/22; G01L 5/1627
See application file for complete search history.

(56) References Cited

U.S. PATENT DOCUMENTS

| | | | | |
|---|---|---|---|---|
| 4,816,713 A | * | 3/1989 | Change, Jr. | ......... G01P 15/0907 310/329 |
| 5,760,530 A | * | 6/1998 | Kolesar | ................. H10N 39/00 310/317 |
| 5,900,592 A | * | 5/1999 | Sohns | ..................... G01G 7/06 177/210 C |
| 7,772,960 B2 | * | 8/2010 | Baker | ................... H01C 10/10 338/114 |

(Continued)

OTHER PUBLICATIONS

International Search Report and Written Opinion of the International Searching Authority for PCT Application PCT/US2019/052519 dated Dec. 6, 2019.

(Continued)

*Primary Examiner* — Max H Noori
(74) *Attorney, Agent, or Firm* — Michael G. Monyok (57) ABSTRACT

A force sensor comprising a force sensitive resistor having a common electrode and an electrode array separated by a force sensitive resistor material. The sensor includes a preload structure, where the preload structure imparts a force on the force sensitive resistor material. The sensor may also include a signal conditioning board to read a signal from the electrode array and convert it to a digital output.

10 Claims, 6 Drawing Sheets

(56) References Cited

U.S. PATENT DOCUMENTS

| | | |
|---|---|---|
| 2003/0222660 A1 | 12/2003 | Morimoto |
| 2009/0134966 A1 | 5/2009 | Baker |
| 2012/0090409 A1 | 4/2012 | Luthje et al. |
| 2014/0373636 A1 | 12/2014 | Yang et al. |
| 2015/0090409 A1 | 4/2015 | Mullet et al. |
| 2018/0314368 A1* | 11/2018 | Isaacson ............. G06F 3/04146 |
| 2023/0134496 A1* | 5/2023 | Della Pepa ....... E04F 15/02144 52/403.1 |

OTHER PUBLICATIONS

Perner-Wilson, H. et al. "Handcrafting Textile Sensors from Scratch".
S. LLC, "FSR 101 Force Sensing Resistor Theory and Applications," pp. 1-15, 2017.

* cited by examiner

FORCE SENSOR

CROSS-REFERENCE TO RELATED APPLICATIONS

This application claims the benefit under 35 U.S.C. § 119 of Provisional Application Ser. No. 62/765,959, filed Sep. 21, 2018, which is incorporated herein by reference.

STATEMENT REGARDING FEDERALLY SPONSORED RESEARCH

This invention was made with government support under IIS-1426655 awarded by the National Science Foundation. The government has certain rights in this invention.

BACKGROUND OF THE INVENTION

The invention relates to a force sensor. More specifically, the invention relates to a low-cost, tri-axial force sensor utilizing a force sensitive resistor. The sensor can be used in a variety of applications, such as robotics, for example.

A robot can use many different types of sensors to acquire data about its surroundings and to help it perform its functions. However, for certain applications, tactile feedback may not be provided due to the cost or unreliability of the touch sensor. For example, robots have been deployed to assist surgeons in minimally invasive surgery due to the increased precision and dexterity offered by robots. These robots are typically teleoperated using visual feedback from a stereo vision system and do not incorporate force sensors. The lack of tactile or force feedback in such systems results in the over dependence on visual information, leading to increased tissue trauma and damage. Moreover, the lack of force feedback makes it difficult for the surgeons to perform several tasks during surgery such as palpation, tissue retraction, and tumor detection.

Several approaches have been developed for force sensing, the most common one being the use of displacement sensors such as potentiometers, linear variable differential transformers (LVDT), and Hall-effect sensors. However, errors in displacement measurements resulting from joint friction and backlash in mechanical drive, when used in a robotic application, can adversely affect the force measurement. Strain gauges are another popular option used for force sensing, but complicated fabrication procedures and low sensitivity are limitations of strain gauge-based sensors. When compared with the strain gauges, capacitance-based sensors can achieve higher sensitivity in force measurements, yet capacitance-based sensors suffer from severe hysteresis problems and provide a relatively small range of force sensing. Piezoelectric sensors can show very high sensitivity, good linearity, and high signal-to-noise ratio, but these sensors exhibit sensitivity to temperature and instability due to charge leakages when measuring static forces.

Another type of sensor are a force sensitive resistor (FSR) sensors, which are more shock resistant than other types of sensors, can work in temperature ranges from room temperature to about 170° C., and are relatively insensitive to humidity. These attributes make this type of sensor attractive for deployment in adverse conditions, which are often encountered in robotic applications. Yet, in some prior art, FSR sensors are slow devices with a mechanical rise time of 1-2 ms and have low sensitivity to small vibrations and low amplitude. In addition, FSR sensors tend to drift in resistance under constant load. Therefore, it would be advantageous to develop a low-cost, robust sensor that could provide reliable force readings in a variety of conditions.

BRIEF SUMMARY

According to one embodiment of the present invention, a force sensor comprises an array of force sensitive resistors with a mechanically pre-loaded structure. In one embodiment, the sensor further comprises a built-in signal conditioning circuitry to provide on-board power regulation, programmable signal amplification, and analog to digital conversion. Unlike prior FSR sensors, the sensor of the present invention is highly sensitive to low-amplitude force (less than 1 N) and can decode multi-axis force vector in a low-profile package. The sensor design permits low-cost and ease of fabrication.

DETAILED DESCRIPTION

Figure 1:
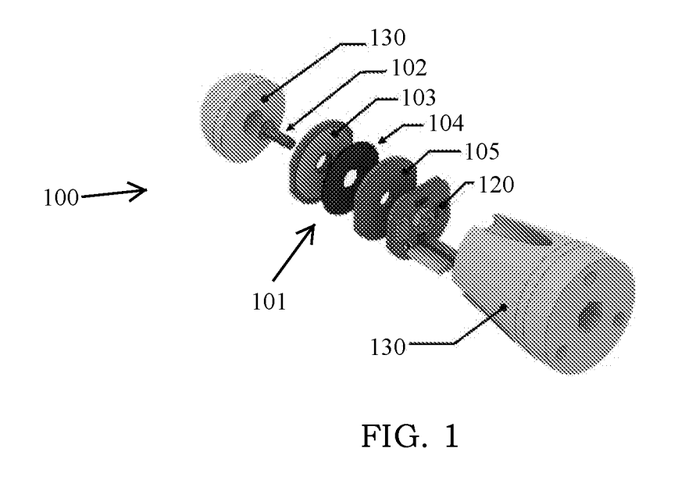
FIG. 1 shows a force sensor, according to one embodiment.

Referring to an example embodiment shown in FIG. 1, the sensor 100 comprises a force sensitive resistor 101 secured by a preload structure 102. The preload structure 102 is used to maintain the force sensitive resistor material 104 in a mechanically preloaded state. A force applied to the material 104 brings the particles in contact with the electrodes 103/105 and reduces the resistance of the material 104. Further, preloading reduces the minimum force required for contact detection and results in a decrease in the nonlinearity of the measurements. In the example shown in FIG. 1, the sensor 100 further comprises a signal conditioning board 120 and a protective housing 130. The housing 130 is optional depending on the application for which the sensor 100 is being deployed.

Referring again to FIG. 1, which is an exploded view of the sensor 100, the force sensitive resistor 101 comprises a common reference electrode 103, a force sensitive resistor material 104, and an electrode array 105. In one embodiment, the common reference electrode 103 and the electrode array 105 are fabricated on separate printed circuit boards, with the electrode array 105 having four sensing elements. The exploded view in FIG. 1 shows the various layers of the force sensitive resistor 101, where the force sensitive resistor material 104 is disposed between the common reference electrode 103 and the electrode array 105. When in use, the electrodes 103/105 are in direct contact with the force sensitive resistor material 104, with the preload structure 102 drawing the electrodes 103/105 towards each other and thereby imparting a force on the force sensitive resistor material 104.

Figure 2A:
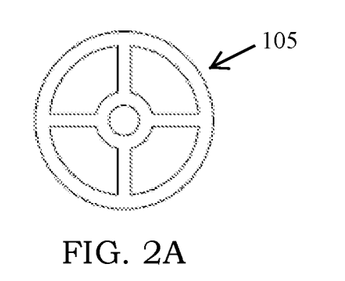
FIGS. 2A-2E show alternative embodiments of an electrode array.
Figure 2B:
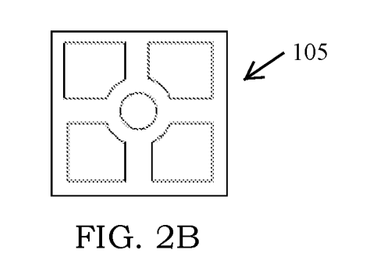
Figure 2C:
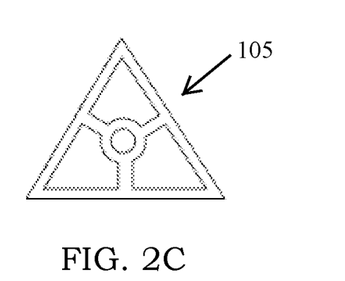
Figure 2D:
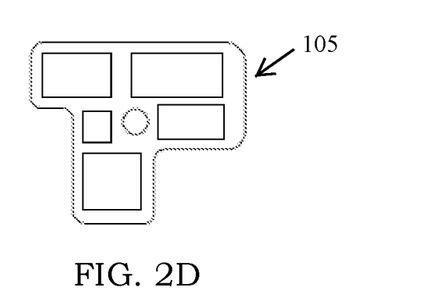
Figure 2E:
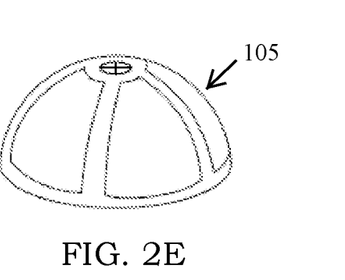

In the example embodiment shown in FIG. 1, the electrode array 105 is circular in shape. However, various shapes can be used, as shown in FIGS. 2A-2D. Furthermore, the electrode array 105 can take non-planar shapes, as shown in FIG. 2E. Also shown in FIGS. 2A-2E, the number of elements on the electrode array 105 can vary. For example, the electrode array 105 in FIG. 2A has four elements, whereas the array 105 in FIG. 2C has three elements. As will be discussed in greater detail, having multiple elements on the electrode array allows multi-axis force measurements.

The force sensitive resistor material 104 comprises a thin sheet of polymer having both electrically conducting and non-conducting particles embedded within it. For example, Velostat film manufactured by 3M™ can be used as the force sensitive resistor material 104. In alternative embodiments, other types of pressure-sensitive materials may be used.

Figure 3:
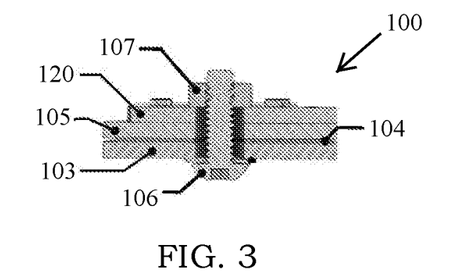
FIG. 3 is a cross-section view of the force sensor, according to an alternative embodiment.

FIG. 3 is a cross-sectional view of a sensor 100 without the optional housing 130, which shows the electrodes 103/105 separated by the force sensitive resistor material 104. A force applied to the polymeric film 104 brings the particles in contact with the electrodes 103/105 and reduces the resistance of the material 104. Arranged in this manner, the force sensitive resistor 101 operates in thru-mode, with the force sensitive resistor material 104 layered between the electrodes 103/105. As opposed to a shunt mode force sensitive resistor, where the positive and negative electrodes are placed on the same layer with a semi-conductive polymer film covering the electrodes, thru-mode construction allows a quicker response and more linear behavior during a force loading phase.

The center aligned fastener of the preload structure 102 shown in FIG. 1 and FIG. 3 allows the common reference electrode 103 to pivot around the center point like a 2 degree of freedom (DOF) seesaw. When in use, any contacting force aligned at an angle to the sensor's central axis would result in a measurement difference between the arrayed electrodes 105 underneath the force sensitive resistor material 104. The difference in the magnitude of the output from each electrode in the array 105 is related to the angle and magnitude of the force vectors, and the relationship between these two factors can be determined. Thus, the design of the sensor 100 permits the decoding of a 3-DOF force vector by the analysis of multichannel array signals.

Figure 4:
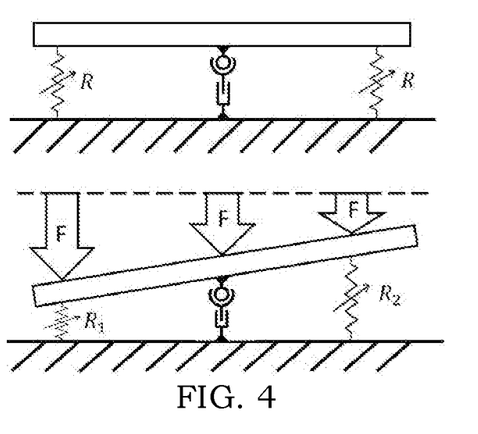
FIG. 4 is a representation of forces acting on a model sensor.

By way of further detail, the force vector can be estimated using a simplified seesaw model of the forces measured on a sensor, as illustrated in FIG. 4. A centered fulcrum allows the top electrode to tilt and descend, causing the forces to be transmitted to the polymer layer, resulting in changes in its resistance. A non-axial force can hence be decoupled into four sensing outputs of a force sensitive resistor 101 having four electrodes in the array 105. In this design, the model is applied to a 2D seesaw structure, with the fulcrum placed in the center of a 2×2 sensing array and modeled as a combination of a ball joint and prismatic joint. The four sensing elements in this array act as independent variable resistors, whose resistance changes when an external force is applied and provides the magnitude and direction of the contact force.

While the example embodiments have described the preload structure 102 as a centrally located mechanical fastener, other devices can be used. For example, fasteners located on the exterior of the electrodes 103/105 would allow flexing within the interior portion of the sensor 100. Similarly, flexible fastening systems, such as a silicone disposed between the two electrodes 103/105, could allow each to pivot, as described in the seesaw model.

The preload structure 102 shown in the embodiment in FIG. 3 is a mechanical fastener that binds the three layers of the resistor 101 together and can be used to place the force sensitive resistor material 104 in a preloaded state. In the embodiment depicted in FIG. 3, the preload structure 102 comprises a screw, washer, and nut, where the screw passes through all three layers of the resistor 101 and engages a nut on the signal conditioning board 120. Thus, all of the layers of the resistor 101 are mechanically and electrically connected by the preload structure 102.

In one embodiment, the sensor 100 is fabricated from a 2-layer panelized printed circuit board (PCB), with three functioning board modules contained in one panel and all surface mount components are located on the same side of the board. With a PCB as the main building block of the sensor 100, fabrication and assembly can be simplified, thus enabling quick production at a minimal cost.

Figure 5:
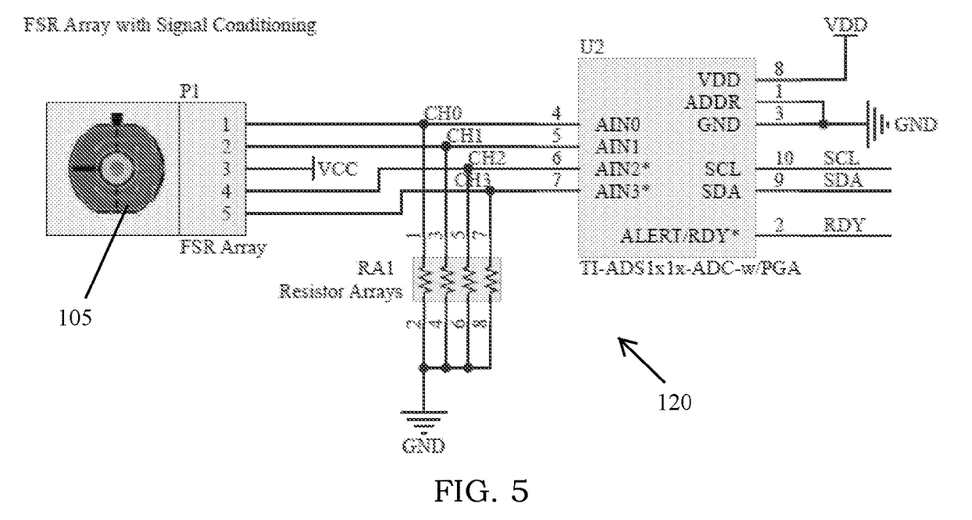
FIG. 5 is a schematic of a signal conditioning circuit.

The signal conditioning board 120 is used to transform the variable resistance of the force sensitive resistor 101 to voltage analog outputs, amplify the signal, convert it to digital data, and transmit the data to a host system through a communication bus. FIG. 5 is a schematic of the signal conditioning circuit, and its connection to the electrode array 105, according to one embodiment. As shown in FIG. 5, the signal conditioning circuit consists of an array of pull-down resistors and an analog to digital converter (ADC).

The signal conditioning board 120 may also include a communications interface. In one embodiment, the digital communication of the sensor 100 utilizes Inter-Integrated Circuit (I2C) as the standard protocol and interface. An external host processor, such as a microcontroller or a PC, is necessary to send commands and acquire data from the force sensor 100 via the I2C bus. Compared to the analog signal bus that is used in traditional FSR sensors, the digital communication bus eliminates the possibility of introducing electromagnetic noise to the analog data along the cable routing path.

Figure 6:
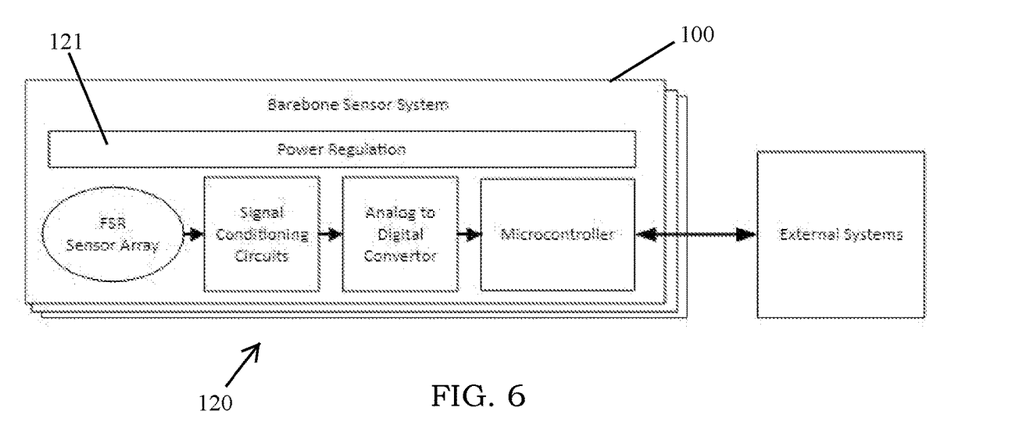
FIG. 6 is a diagram of the sensor architecture.

The sensor 100 may also include an onboard power regulator 121. For example, in one embodiment a subminiature onboard power regulator such as the TLV716/P regulator manufactured by Texas Instruments Inc. is used. This type of regulator 121 is a capacitor-free dual 150 mA output voltage regulator in a 1.2 mm×1.2 mm SON package. The built-in dual power output enables the separation between analog and digital circuits, to further minimize the interference across both the systems. This allows the signal conditioning circuit to acquire analog signals more accurately and reliably. A diagram of the overall sensor architecture is shown in FIG. 6.

Figure 7A:
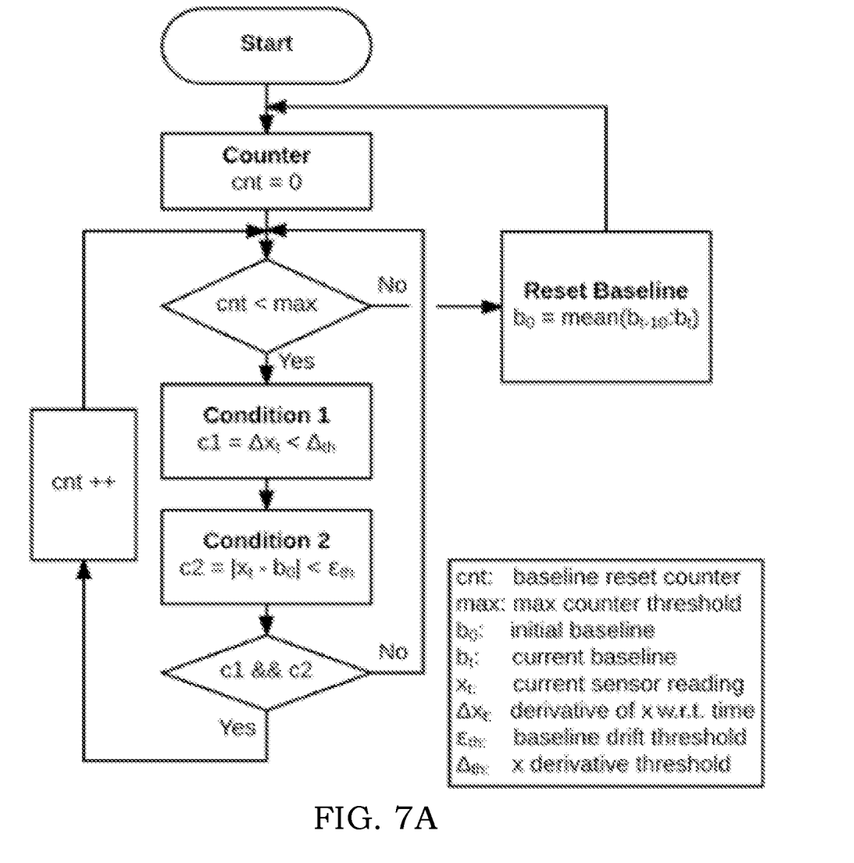
FIG. 7A is a flowchart of a self-calibration process.
Figure 7B:
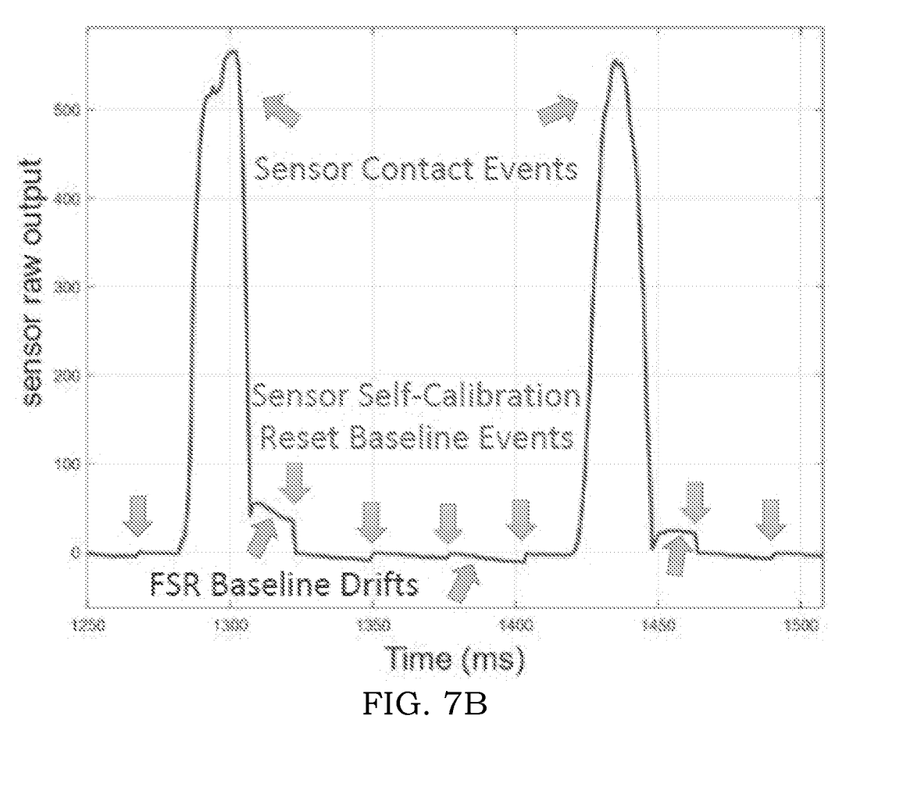
FIG. 7B is a graph depicting a baseline reset event.

If the sensor is subjected to an external force, its zero-force output raw reading (referred to as baseline) changes due to the slight deformation of force sensitive resistor material 104. To minimize this effect of an inconsistently shifting baseline on the accuracy of sensor reading, a baseline reset is implemented. A process for sensor self-calibration is shown in the flowchart in FIG. 7A, with the results of the self-calibration process shown in FIG. 7B. As shown in FIG. 7A, the process comprises comparing a count maintained by a baseline reset counter to a threshold value and resetting the baseline to the mean of the current baseline and a previous baseline if the threshold is exceeded.

A sensor 100 thus described and depicted in the drawings has a small size and low profile, enabling it to be used in a variety of applications. For example, the sensor 100 shown in FIG. 1 is about 12 mm by 3 mm (excluding the housing 130) with a mass of 1 g. Further, the sensor 100 is highly sensitive, with a minimal force resolution of 0.1 N and an angular decoding accuracy of +/−10 degrees. In addition, the design of the sensor allows low-cost fabrication as compared to existing sensors.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A force sensor comprising:
   a force sensitive resistor comprising:
      a common reference electrode,
      an electrode array positioned proximate to the common reference electrode, and
      a force sensitive resistor material separating the common reference electrode and the electrode array, wherein the common reference electrode and the electrode array are separated by a distance along a longitudinal axis of the force sensitive resistor; and
   a preload structure mechanically binding the common reference electrode, force sensitive resistor material, and electrode array, wherein the preload structure imparts a compressive force upon the force sensitive resistor material along the longitudinal axis.

2. The force sensor of claim 1, wherein the preload structure engages a center point of each of the common reference electrode, the force sensitive resistor material, and the electrode array.

3. The force sensor of claim 1, wherein the electrode array comprises a plurality of sensing elements.

4. The force sensor of claim 1, further comprising a signal conditioning board in electrical contact with the electrode array, wherein the signal conditioning board receives a signal from the electrode array.

5. The force sensor of claim 1, further comprising a protective housing affixed to the common reference electrode.

6. The force sensor of claim 5, wherein the protective housing comprises a protective tip affixed to the common reference electrode by the preload structure.

7. The force sensor of claim 1, wherein the preload structure comprises a screw having a head that engages the common reference electrode and a threaded portion that engages a nut.

8. The force sensor of claim 4, wherein the signal comprises a resistance of the force sensitive resistor.

9. The force sensor of claim 8, wherein the signal conditioning board converts the signal to a voltage analog output.

10. The force sensor of claim 9, wherein the signal conditioning board converts the voltage analog output to a digital output.

* * * * *